(12) United States Patent
Hoshino

(10) Patent No.: US 8,451,481 B2
(45) Date of Patent: May 28, 2013

(54) FACSIMILE APPARATUS, INFORMATION PROCESSING APPARATUS, INFORMATION PROCESSING METHOD AND COMPUTER READABLE MEDIUM FOR SETTING USE RESTRICTION INFORMATION IN A DOCUMENT

(75) Inventor: Takashi Hoshino, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 403 days.

(21) Appl. No.: 12/723,728

(22) Filed: Mar. 15, 2010

(65) Prior Publication Data

US 2011/0037998 A1 Feb. 17, 2011

(30) Foreign Application Priority Data

Aug. 17, 2009 (JP) ................................. 2009-188329

(51) Int. Cl.
*G06F 15/00* (2006.01)
(52) U.S. Cl.
USPC ........................................ 358/1.15; 709/225
(58) Field of Classification Search
USPC .......................................... 358/1.15; 709/225
See application file for complete search history.

(56) References Cited

U.S. PATENT DOCUMENTS

| 2004/0128555 | A1 | 7/2004 | Saitoh et al. |
| 2006/0168659 | A1 | 7/2006 | Saitoh |
| 2007/0002387 | A1* | 1/2007 | Chase et al. .................. 358/400 |
| 2007/0043864 | A1 | 2/2007 | Nemoto |
| 2008/0047020 | A1* | 2/2008 | Masui ............................. 726/26 |
| 2009/0033994 | A1* | 2/2009 | Urakawa et al. ............. 358/1.15 |
| 2010/0149601 | A1* | 6/2010 | Baird et al. .................... 358/403 |

FOREIGN PATENT DOCUMENTS

| JP | 2004-166241 A | 6/2004 |
| JP | 2006-185153 A | 7/2006 |
| JP | 2007-052593 A | 3/2007 |
| JP | 2008-181290 A | 8/2008 |

OTHER PUBLICATIONS

Machine translation for JP2008-181290, IDS.*

* cited by examiner

Primary Examiner — Qian Yang
(74) Attorney, Agent, or Firm — Sughrue Mion, PLLC

(57) ABSTRACT

A facsimile apparatus includes an acquisition unit and a first registration unit. The acquisition unit acquires a transmission source number and a reception number of a facsimile reception document. The first registration unit acquires use restriction information corresponding to the transmission source number and the reception number acquired by the acquisition unit from a first storage unit for storing first correspondence relation information in which use restriction information of documents and transmission source numbers and reception numbers of facsimile communication are associated with each other, and registers second correspondence relation information in which the use restriction information and the facsimile reception document are associated with each other in a second storage unit for storing correspondence relation information between documents and use restriction information.

9 Claims, 17 Drawing Sheets

FIG. 3

| RECEPTION NUMBER | TRANSMISSION SOURCE NUMBER | POLICY ID |
|---|---|---|
| LINE 1: 03-xxxx-xx01 | X COMPANY: 03-xxxx-xx11 | 0003 |
| LINE 1: 03-xxxx-xx01 | N/A | 0001 |
| LINE 2: 03-xxxx-xx02 | N/A | 0002 |

FIG. 4

| DOCUMENT ID | POLICY ID |
|---|---|
| 40ffaaa4-0fb6-4634-85bf-bba45gc941b5 | 0001 |
| 6FB6BB00-3347-11d0-B40A-00AA005FF586 | 0001 |
| VED6483F-3304-11d2-86F1-006008B0E5D2 | 0002 |
| CDF9C30D-CCAB-3E2D-B584-9E24CE8038E3 | 0003 |

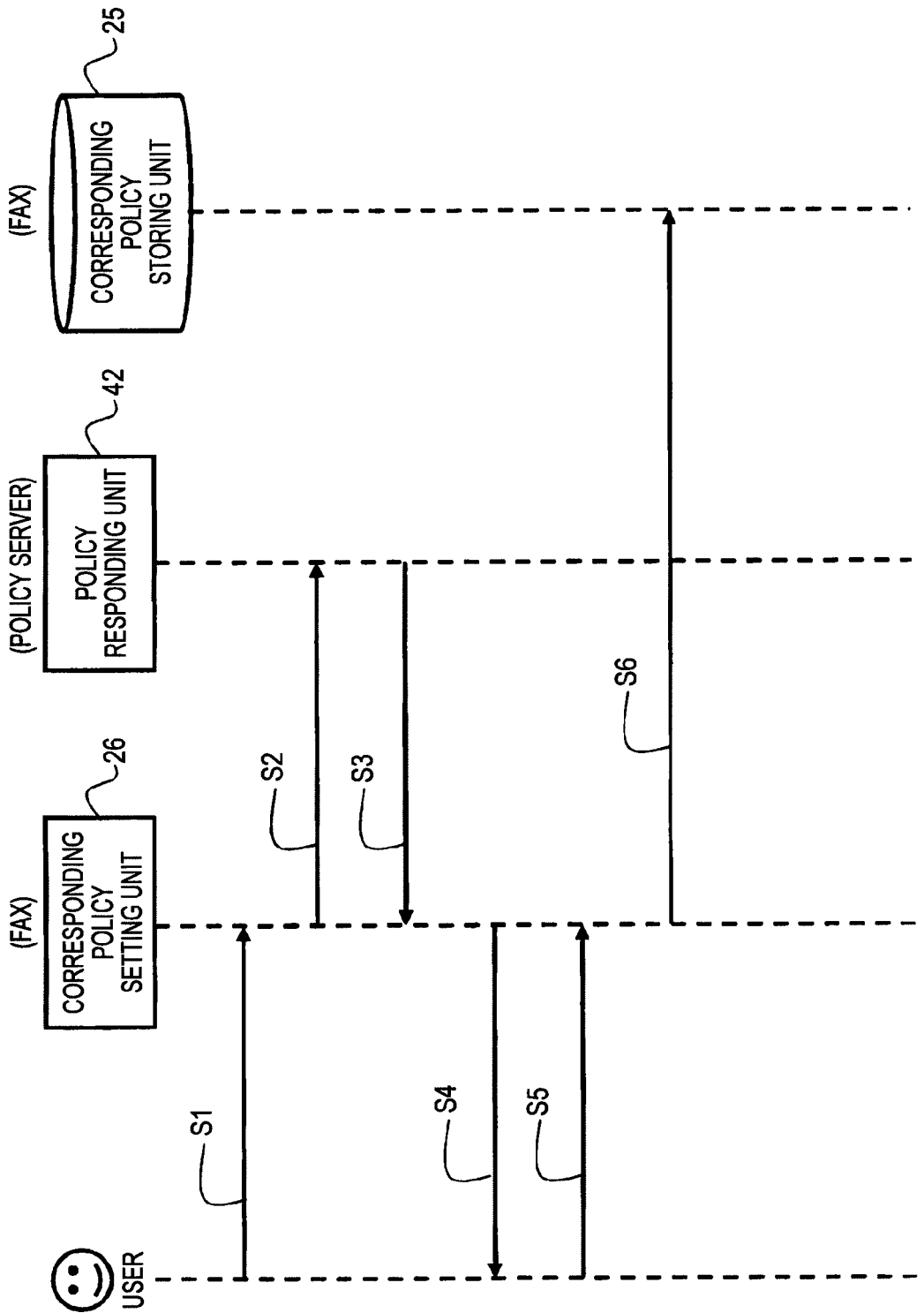

FIG. 7

| POLICY ID | POLICY NAME | USE RANGE | TERM OF VALIDITY | AVAILABLE FUNCTION LIST | PROCESS REQUIREMENT |
|---|---|---|---|---|---|
| 0001 | PERSONNEL DEPARTMENT DATA | DEPARTMENT NAME: PERSONNEL DEPARTMENT | ONE YEAR FROM CREATION | READING OF ELECTRONIC DOCUMENT PRINTING OF ELECTRONIC DOCUMENT | PRINTING OF SECRET MARK |
| 0002 | REFERENCE DATA | WHOLE COMPANY | ONE YEAR FROM CREATION | READING OF ELECTRONIC DOCUMENT PRINTING OF ELECTRONIC DOCUMENT SCANNING OF PAPER DOCUMENT COPYING OF PAPER DOCUMENT TRANSMISSION OF FAX | |
| 0003 | DOCUMENT CONCERNING COMPANY X | DEPARTMENT NAME: DEVELOPMENT DEPARTMENT | HALF YEAR FROM CREATION | READING OF ELECTRONIC DOCUMENT SCANNING OF PAPER DOCUMENT | |
| 0004 | CORRECTION DOCUMENT | DEPARTMENT NAME: DEVELOPMENT DEPARTMENT | INDEFINITE | FAX REPLY TO TRANSMISSION SOURCE | |

FIG. 13

| DOCUMENT ID | POLICY ID | FAX TRANSMITTING SOURCE |
|---|---|---|
| 40ffaaa4-0fb6-4634-85bf-bba45gc941b5 | 0001 | |
| 6FB6BB00-3347-11d0-B40A-00AA005FF586 | 0001 | |
| VED6483F-3304-11d2-86F1-006008B0E5D2 | 0004 | 03-xxxx-0001 |
| CDF9C30D-CCAB-3E2D-B584-9E24CE8038E3 | 0004 | 03-xxxx-0002 |

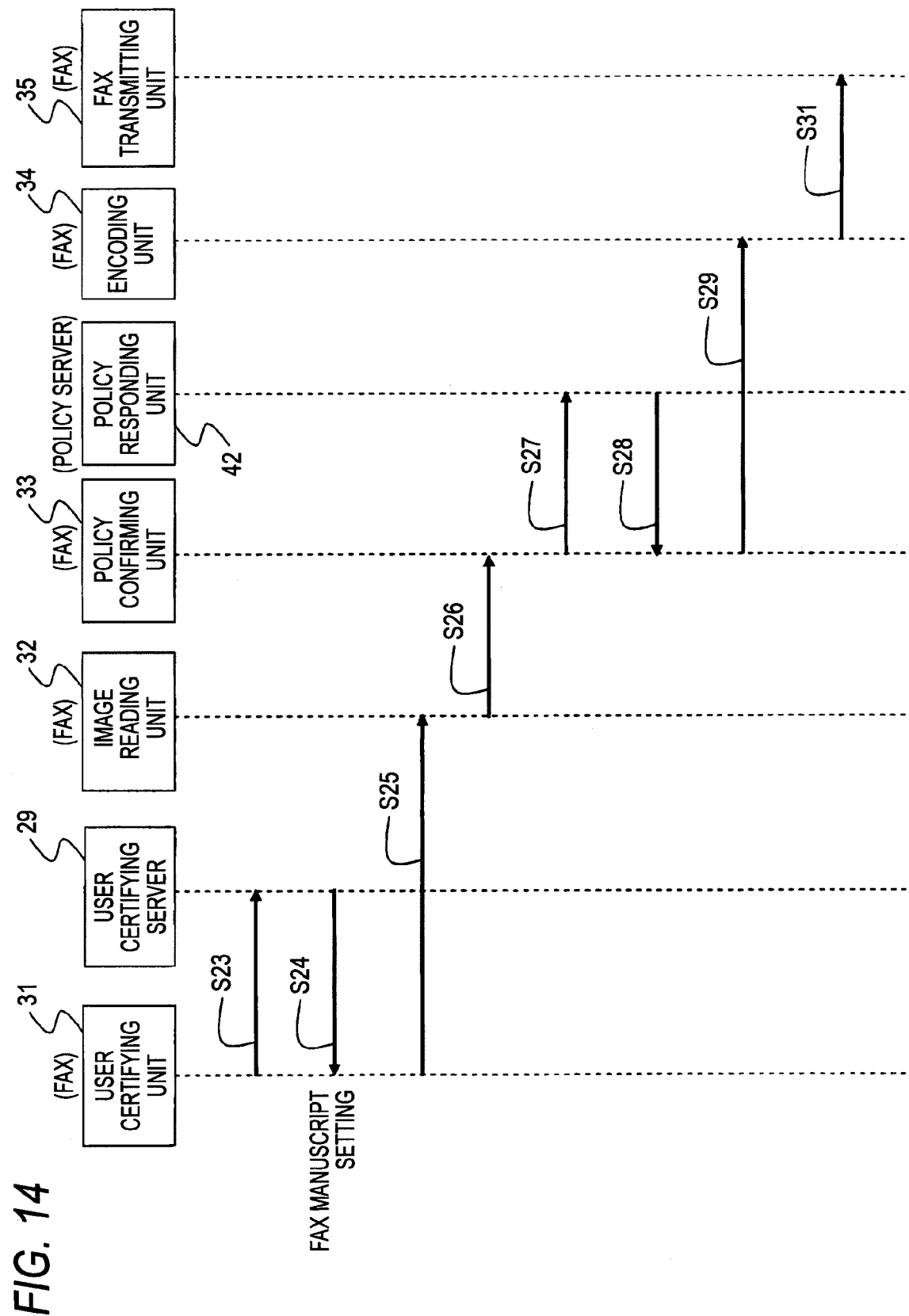

FACSIMILE APPARATUS, INFORMATION PROCESSING APPARATUS, INFORMATION PROCESSING METHOD AND COMPUTER READABLE MEDIUM FOR SETTING USE RESTRICTION INFORMATION IN A DOCUMENT

CROSS-REFERENCE TO RELATED APPLICATIONS

This application is based on and claims priority under 35 USC 119 from Japanese Patent Application No. 2009-188329 filed on Aug. 17, 2009.

BACKGROUND

1. Technical Field

The present invention relates to a facsimile apparatus, an information processing apparatus, an information processing method and a computer readable medium.

2. Related Art

Sometimes, use restriction information in regard to a document to prevent the document from being wrongly is set. The use restriction information indicates information which sets various operations with regard to documents such as reading, editing, printing, and transmitting of documents which are available operations or unavailable operations for each user or group of users. And the use restriction information is set for each document, thereby preventing documents from being wrongly used.

When the use restriction information is set for the document, there are a case where a user such as a writer of a document sets the use restriction information at the time of creating the document, and a case where a setting condition of the use restriction information are set in advance and use restriction information is automatically set according to the setting condition whenever a document is created.

SUMMARY

According to an aspect of the invention, a facsimile apparatus includes an acquisition unit and a first registration unit. The acquisition unit acquires a transmission source number and a reception number of a facsimile reception document. The first registration unit acquires use restriction information corresponding to the transmission source number and the reception number acquired by the acquisition unit from a first storage unit for storing first correspondence relation information in which use restriction information of documents and transmission source numbers and reception numbers of facsimile communication are associated with each other, and registers second correspondence relation information in which the use restriction information and the facsimile reception document are associated with each other in a second storage unit for storing correspondence relation information between documents and use restriction information.

BRIEF DESCRIPTION OF THE DRAWINGS

Exemplary embodiment(s) of the present invention will be described in detail based on the following figures, wherein:

FIG. 3 is a diagram illustrating an example of a list in which combinations of transmission source numbers, reception numbers, policy IDs are stored;

FIG. 4 is a diagram illustrating an example of a list in which combinations of document IDs and policy IDs are stored;

FIG. 6 is a diagram illustrating an example of sequence of newly registering combinations of transmission source numbers, reception numbers, and policy IDs;

FIG. 7 is a diagram illustrating an example of a list in which policy IDs and use restriction information are stored;

FIG. 13 is a diagram illustrating an example of a list in which document IDs, policy IDs, facsimile transmission source numbers are associated with each other; and FIG. 14 is a diagram illustrating an example of sequence of performing an erroneous transmission preventing function.

DETAILED DESCRIPTION

Figure 1:
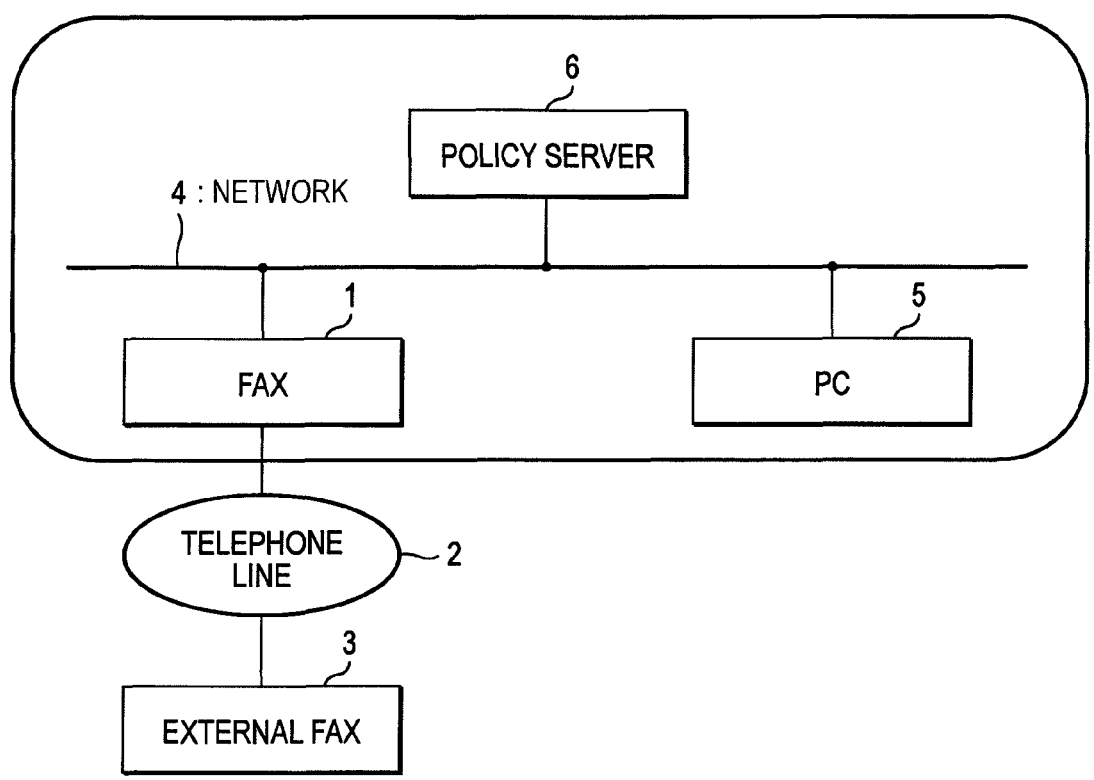
FIG. 1 is a diagram illustrating an example of a facsimile apparatus and peripheral apparatuses thereof according to an exemplary embodiment.

First, a facsimile apparatus according to an exemplary embodiment and peripheral apparatuses will be described with reference to FIG. 1. A facsimile apparatus 1 is connected to a telephone line 2 outside a company. The facsimile apparatus 1 receives a facsimile document transmitted from a facsimile apparatus 3 outside the company through the telephone line 2.

The facsimile apparatus 1 is connected to a network 4 such as an intranet in the company. The network 4 is connected to various apparatuses such as a personal computer 5 and a scanner (not shown) in addition to the facsimile apparatus 1, and is connected to a policy server 6 which stores use restriction information (called security policy, or merely policy) of documents created by the apparatuses connected to the network 4.

The use restriction information is information which sets various operations with regard to documents such as reading, editing, printing, and transmitting of documents which are available operations or unavailable operations for each user or group of users. Hereinafter, the use restriction information is referred to as a policy. In the exemplary embodiment to be described hereinafter, a plurality of policies with different contents is prepared, and identification information (referred to as policy ID) is assigned to the policies and stored in a policy server 6.

In the exemplary embodiment to be described hereinafter, identification information (referred to as document ID) is assigned to documents created by the apparatuses connected to the network 4. The policy server 6 stores combinations of the document IDs and the policy IDs.

Figure 2:
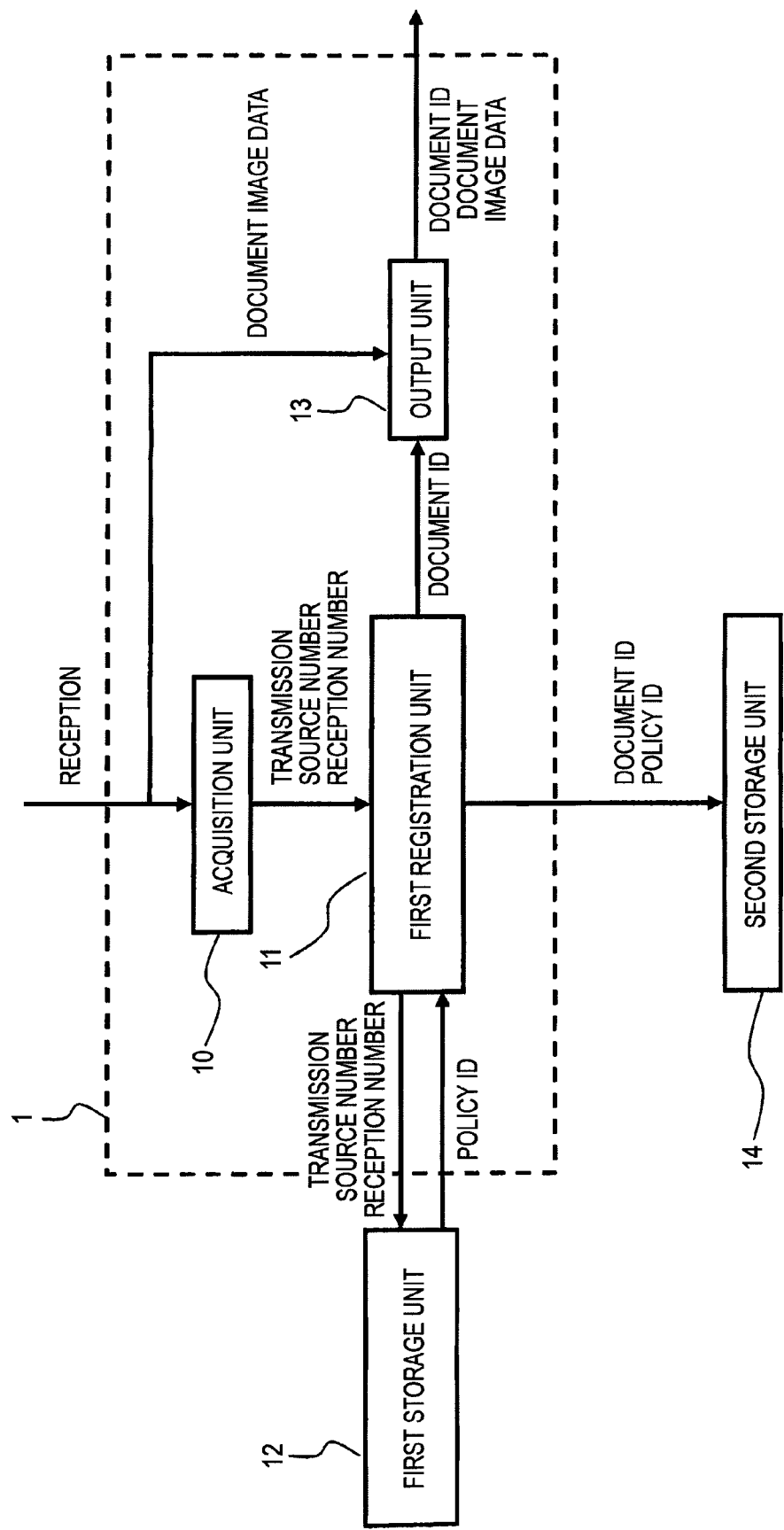
FIG. 2 is a functional block diagram illustrating an example of the facsimile apparatus according to the exemplary embodiment.

Next, an outline of a configuration of automatically assigning policies to facsimile reception documents by the facsimile apparatus 1 according to the exemplary embodiment will be described with reference to FIG. 2. FIG. 2 shows the facsimile apparatus 1 represented by a plurality of functional blocks (blocks represented by "~ unit") with respect to functions used at the time of assigning the policies.

First, a configuration of the functional blocks of the facsimile apparatus 1 and peripheries thereof will be described. The facsimile apparatus 1 is provided with an acquisition unit 10 for acquiring transmission source numbers and reception numbers of facsimile reception documents received from the external facsimile apparatus 3. The acquisition unit 10 is connected to a first registration unit 11, and the acquisition unit 10 transmits the facsimile transmission source numbers and reception numbers to the first registration unit 11.

The first registration unit 11 is connected to a first storage unit 12. The first storage unit 12 stores in advance transmission source numbers, reception numbers, and combinations of policies corresponding to pairs of the transmission source numbers and the reception numbers, extracts a policy corresponding to the transmission source number and reception number transmitted from the first registration unit 11, and transmits a policy ID of the policy to the first registration unit 11. The first storage unit 12 may be provided outside of the facsimile apparatus 1 as shown in FIG. 2, and may be provided therein.

The first registration unit 11 is connected to a second storage unit 14. The policy server 6 shown in FIG. 1 corresponds to the second storage unit 14. The first registration unit 11 registers the pair of the document ID and the policy ID of the facsimile reception document into the second storage unit 14. Accordingly, the second storage unit 14 stores the correspondence relation between the facsimile reception document and the policy. The second storage unit 14 may be provided outside of the facsimile apparatus 1 as shown in FIG. 2, and may be provided therein.

The output unit 13 receives document image data of the facsimile reception document transmitted from the external facsimile apparatus 3, and receives the document ID of the facsimile reception document from the first registration unit 11. The output unit 13 outputs the document image data and the document ID by using a paper medium or an electronic medium. The output unit 13 may be provided in the facsimile apparatus 1 as shown in FIG. 2, and may be provided outside.

The configuration of the functional blocks of the facsimile apparatus 1 and the peripheries thereof has been described above. Next, a flow from when the facsimile apparatus 1 receives the facsimile reception document to when the policy is automatically assigned to the facsimile reception document will be described. The facsimile apparatus 1 decodes a signal received from the external facsimile apparatus 3 to create document image data. The document image data is transmitted to the output unit 13.

When the transmission source number of the facsimile reception document is transmitted by a number notification function of the external facsimile apparatus 3, the transmission source number is transmitted to the first registration unit 11 through the acquisition unit 10. When the transmission source number is not transmitted from the external facsimile apparatus 3, the acquisition unit 10 reads the transmission source number from the document image data of the facsimile reception document. Then, the acquisition unit 10 transmits the transmission source number to the first registration unit 11.

When the acquisition unit 10 transmits the transmission source number to the first registration unit 11 and a plurality of reception numbers is assigned to the facsimile apparatus 1, the reception number designated by the external facsimile apparatus 3 is also transmitted to the first registration unit 11. When only one reception number is assigned to the facsimile apparatus 1, the acquisition unit 10 may transmit the reception number to the first registration unit 11 as described above and instead the transmission of the reception number may be omitted with the reception number stored in the first registration unit 11.

The first registration unit 11 transmits the transmission source number and the reception number of the facsimile reception document transmitted from the acquisition unit 10 to the first storage unit 12. As shown in FIG. 3, the transmission source numbers, the reception numbers, and the policy IDs corresponding to the pairs of the numbers are stored in advance in the first storage unit 12. In the list in which the combinations of the transmission source numbers, the reception numbers, and the policy IDs shown in FIG. 3 are stored, a section for creating policies may be provided instead of the section of the policy IDs. Sections of creation dates of new contents or updating dates of updating contents may be added to the section of the list shown in FIG. 3.

"N/A" may be input to the section of the transmission source number in the list shown in FIG. 3, instead of inputting the specific facsimile numbers. This is to assume a case where the transmission source number acquired by the acquisition unit 10 is not stored in the first storage unit 12. In this case, the policy ID is selected for the facsimile reception document according to only the reception number. That is, in the exemplary embodiment, basically, the policy ID associated with the facsimile reception document is determined according to the pair of the transmission source number and the reception number, and the policy ID can be determined even when the transmission source number is unclear. Even when the external facsimile apparatus 3 does not have the number notification function and the acquisition unit 10 cannot read the transmission source number from the document image data of the facsimile reception document, this case may be determined to be considered as "N/A" for the transmission source number.

Returning to FIG. 2, the first storage unit 12 searches the policy ID corresponding to the pair of the reception number and the transmission source number transmitted from the first registration unit 11, and transmits the search result to the first registration unit 11. The first registration unit 11 associates the received policy ID and the document ID newly created for the facsimile reception document and registers them in the second storage unit 14.

In this case, as for the document ID of the facsimile reception document, it is necessary to avoid overlapping with the document ID of the already created document. For this reason, in the creating of the document ID of the facsimile reception document, the document ID is created after previously confirming that there no overlapping by using random numbers or referring to the already created document ID stored in document information data base (to be described later) in the policy server 6. The creating of the document ID for the facsimile reception document may be performed by the facsimile apparatus 1, and may be performed by the other apparatus on the network such as the policy server 6.

As shown in FIG. 4, the document IDs and the policy IDs corresponding thereto are stored in the second storage unit 14. When the pair of the document ID of the facsimile reception document and the policy ID is transmitted to the second storage unit 14 from the first registration unit 11 of the facsimile apparatus 1, the second storage unit 14 newly stores the pair.

The first registration unit 11 transmits the document ID of the facsimile reception document to the output unit 13. The document image data of the facsimile reception document is transmitted to the output unit 13, which outputs the document image data with the document ID added thereto. At the time of the outputting, when there is an instruction of a specific process to be performed on the output medium in the policy corresponding to the document ID of the facsimile reception document (words such as "confidential" and "copy prohibited" are added to the output medium), the process contents are transmitted to the output unit 13.

The output processes of the output unit 13 are different according to output mediums. For example, when the output medium is a paper medium, the document image data, the document ID, and the process contents are printed on the paper medium. When the output medium is an electronic medium, the document ID and the process contents are set to attribute information (property) of the document image data. For either medium, from the addition of the document ID to the output medium, when referring to the second storage unit 14 for the document ID, the policy ID corresponding to the document ID and the policy corresponding to the policy ID are acquired.

Further, when the output medium is a paper medium, the output unit 13 may output the document image data and the document ID via generating a composite image thereof, or may output them via generating plural images thereof. When generating the plural images, the output unit 13 may include a document image data printing unit and an identification information adding unit. Specifically, the document image data printing unit prints the document image data of the facsimile reception document on a paper medium. The identification information adding unit prints the document ID and the process contents onto the paper medium having the document image thereon.

In the list shown in FIG. 4, a creator ID section for identifying the creators of documents may be provided in addition to the document ID section and the policy ID section. In this case, there are cases where no creator ID is described in the facsimile reception document or the creator ID cannot read from the document image data of the facsimile reception document. Accordingly, an apparatus ID that is identification information of the facsimile apparatus 1 receiving the facsimile reception document may be input to the section of the creator ID. As described later, when the facsimile apparatus 1 is provided with an erroneous transmission preventing function, a section of a transmission source number of the facsimile reception document is also provided in the list shown in FIG. 4.

The outline about the configuration and sequence for automatically assigning the policies to the facsimile reception document by the facsimile apparatus 1 according to the exemplary embodiment has been described above. Next, an example of detailed configurations of the facsimile apparatus 1 and the policy server 6 according to the exemplary embodiment will be described.

Figure 5A:
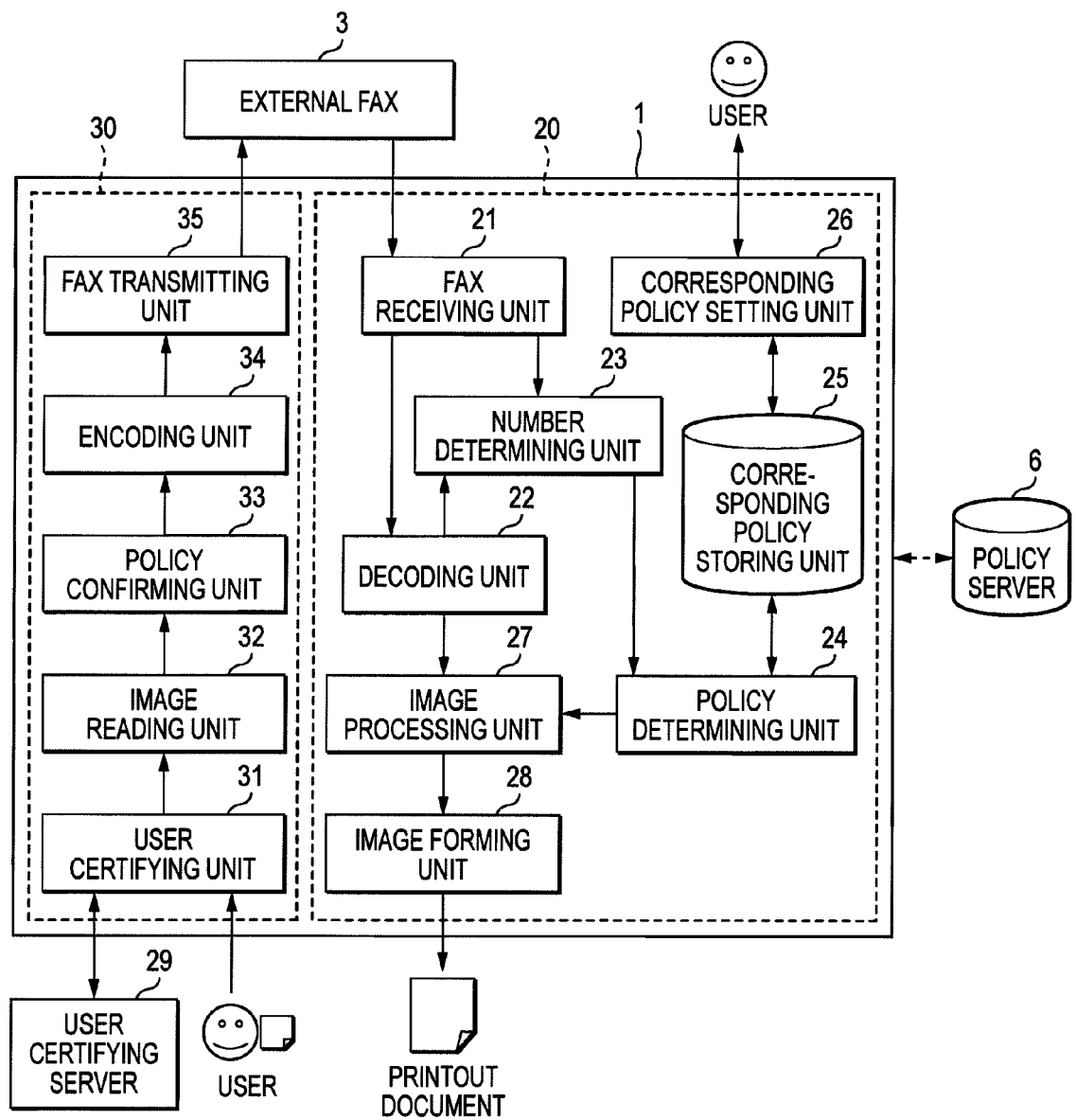
FIG. 5A is a diagram illustrating an example of the facsimile apparatus and a policy server according to the exemplary embodiment.
Figure 5B:
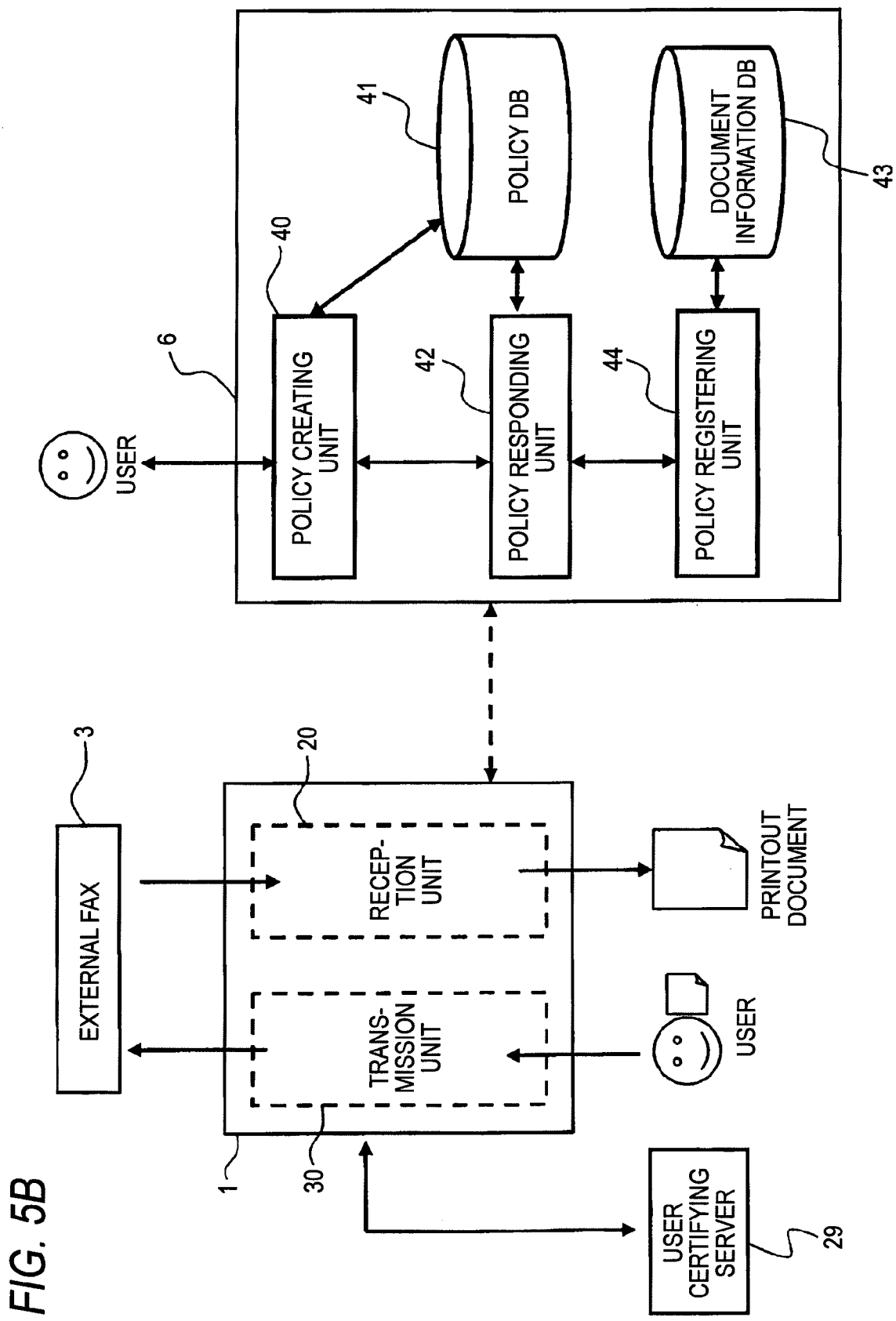
FIG. 5B is a diagram illustrating an example of the facsimile apparatus and a policy server according to the exemplary embodiment.

FIG. 5A and FIG. 5B show examples of the facsimile apparatus 1 and the policy server 6 according to the exemplary embodiment, respectively. FIG. 5A shows a detailed diagram of the facsimile apparatus 1, and FIG. 5B shows a detailed diagram of the policy server 6.

As shown in FIG. 5A, the facsimile apparatus 1 is provided with a reception unit 20 and a transmission unit 30. First, the reception unit 20 will be described. The reception unit 20 is provided with a facsimile receiving unit 21 receiving a signal received from the external facsimile apparatus 3. The facsimile receiving unit 21 is connected to a decoding unit 22 which decodes the signal received from the facsimile to reproduce the document image data.

The facsimile receiving unit 21 and the decoding unit 22 are connected to a number determining unit 23. When the transmission source number is transmitted from the external facsimile apparatus 3, the number determining unit 23 transmits the transmission source number to a policy determining unit 24. When the transmission source number is not transmitted from the external facsimile apparatus 3, the number determining unit 23 reads the transmission source number from the document image data of the facsimile reception document reproduced by the decoding unit 22 and transmits the transmission source number to the policy determining unit 24. When the transmission source number is transmitted to the policy determining unit 24, the reception number of the facsimile apparatus 1 is also transmitted.

The policy determining unit 24 determines a policy ID of the facsimile reception document corresponding to the pair of the transmission source number and the reception number received from the number determining unit 23, and newly creates a document ID of the facsimile reception document. Herein, the policy determining unit 24 is connected to a correspondence policy storing unit 25. Combinations of the pairs of the transmission source numbers and the reception numbers set in advance from the correspondence policy setting unit 26 by the user or the like and the policy IDs corresponding to the pairs is stored in the correspondence policy storing unit 25. When the policy determining unit 24 determines the policy ID of the facsimile reception document, first, the policy determining unit 24 transmits the transmission source number and the reception number of the facsimile reception document to the correspondence policy storing unit 25 and the correspondence policy storing unit 25 returns the policy ID corresponding to the combination to the policy determining unit 24. Then, the policy determining unit 24 newly creates a document ID of the facsimile reception document and transmits the combination of the document ID and the policy ID to the policy server 6.

The policy determining unit 24 and the decoding unit 22 are connected to an image processing unit 27. The image processing unit 27 receives the document image data of the facsimile reception document from the decoding unit 22, receives the document ID of the facsimile reception document from the policy determining unit 24, and performs a process of adding the document ID to the document image data of the facsimile reception document. The image processing unit 27 is connected to an image forming unit 28, and the image forming unit 28 prints the document image data, to which the document ID is added, on a paper medium, or stores the document image data in an electronic medium state.

In the exemplary embodiment shown in FIG. 5A, the number determining unit 23 corresponds to the acquisition unit 10 shown in FIG. 2, the policy determining unit 24 corresponds to the first registration unit 11, the correspondence policy storing unit 25 corresponds to the first storage unit 12, and the image processing unit 27 and the image forming unit 28 correspond to the output unit 13.

Next, the transmission unit 30 will be described. The transmission unit 30 is connected to a user certifying server 29 in which user IDs as identification information of users are stored, and is provided with a user certifying unit 31 performing certification of users who want to perform facsimile transmission. The transmission unit 30 is provided with an image reading unit 32, which is connected to the user certifying unit 31 and reads the document as a facsimile transmission target. The transmission unit 30 is provided with a policy confirming unit 33, which is connected to the image reading unit 32 and confirms the policy ID corresponding to the document ID when the image reading unit 32 reads the document ID from the document as the facsimile transmission target. The transmission unit 30 is provided with an encoding unit 34, which is connected to the policy confirming unit 33 and encodes the document image data of the facsimile transmission target into a facsimile transmission signal. The transmission unit 30 is provided with a facsimile transmitting unit 35, which connected to the encoding unit 34 and transmits the facsimile transmission signal to the external facsimile apparatus 3. Detailed functions of the transmission unit 30 described above will be described later.

A configuration of the policy server 6 will be described with reference to FIG. 5B. The policy server 6 is provided with a policy creating unit 40 which creates policies, and a policy database 41 for storing the created policies. A policy responding unit 42 which responds to an inquiry from the apparatus such as the facsimile apparatus 1 connected to the policy server 6 is connected to the policy creating unit 40, the policy database 41, and a policy registering unit 44. The combination of the document ID and the policy ID transmitted from the apparatus connected to the policy server 6 is transmitted to the policy registering unit 44 through the policy responding unit 42, and the combination is registered in a document information database 43. The correspondence relation between the document ID and the policy ID shown in FIG. 4 is stored in the document information database 43. The document information database 43 corresponds to the second storage unit 14 shown in FIG. 2.

The configurations of the facsimile apparatus 1 and the policy server 6 have been described above. As for the correspondence policy setting unit 26 and the correspondence policy storing unit 25 of the facsimile apparatus 1 described in FIG. 5A, the sequence of storing combinations of a pair of a transmission source number and a reception number newly created in the correspondence policy setting unit 26 and the policy ID corresponding to the pair, in the correspondence policy storing unit 25 will be described hereinafter.

FIG. 6 shows the sequence of storing the combinations of the pair of the transmission source number and the reception number and the policy ID corresponding to the pair in the correspondence policy storing unit 25. First, the user as a setter shown in FIG. 6 requests the correspondence policy setting unit 26 of the facsimile apparatus 1 to newly create combination of the pair of the transmission source number and the reception number and the policy ID corresponding to the pair of the transmission source number and the reception number. Specifically, the correspondence policy setting unit 26 is provided with a user interface such as GUI, and the user selects an icon such as "new contents" displayed on the interface by a manipulation device such as a mouse (S1).

The correspondence policy setting unit 26 receiving the request from the user requests the policy responding unit 42 of the policy server 6 to transmit all the policies stored in the policy database 41 (FIG. 5B) of the policy server 6 (S2). The policy responding unit 42 receiving the request acquires the policies of the policy database 41, and transmits the policies to the correspondence policy setting unit 26 (S3).

The correspondence policy setting unit 26 displays the policies stored in the policy database 41 for the user (S4). The policies are displayed for the user in a list form shown in FIG. 7. The list of the policies shown in FIG. 7 is provided with a policy ID section, a policy name section named for each policy ID, a use range section representing a range (personnel department, whole company, development department, etc.) in which the user can use documents, a validity term section representing a term of validity of the set policies, an available function section in which operations (reading and printing of electronic document, scanning and copying of paper documents, facsimile transmission, etc.) permitted for documents are listed, a process requirement section in which processes (a secret mark is printed, etc.) performed on a restriction target documents are determined. In addition, an updating date section displaying the updated date when the contents of the policies are updated or the like may be provided.

The user selects the policy ID while viewing the list of the policies displayed on the correspondence policy setting unit 26, and inputs a transmission source number and a reception number corresponding to the policy ID (S5). As a result, as shown in FIG. 3, the combination of the reception number, the transmission source number, and the policy ID is newly set and stored in the correspondence policy storing unit 25 (S6).

The sequence of newly storing the combinations of the transmission/reception numbers and the policy ID in the correspondence policy storing unit 25 has been described above. Next, sequence of automatically assigning the policy to the facsimile reception document by the facsimile apparatus 1 and the policy server 6 shown in FIG. 5A and FIG. 5B will be described with reference to FIG. 8A and FIG. 8B.

Figure 8A:
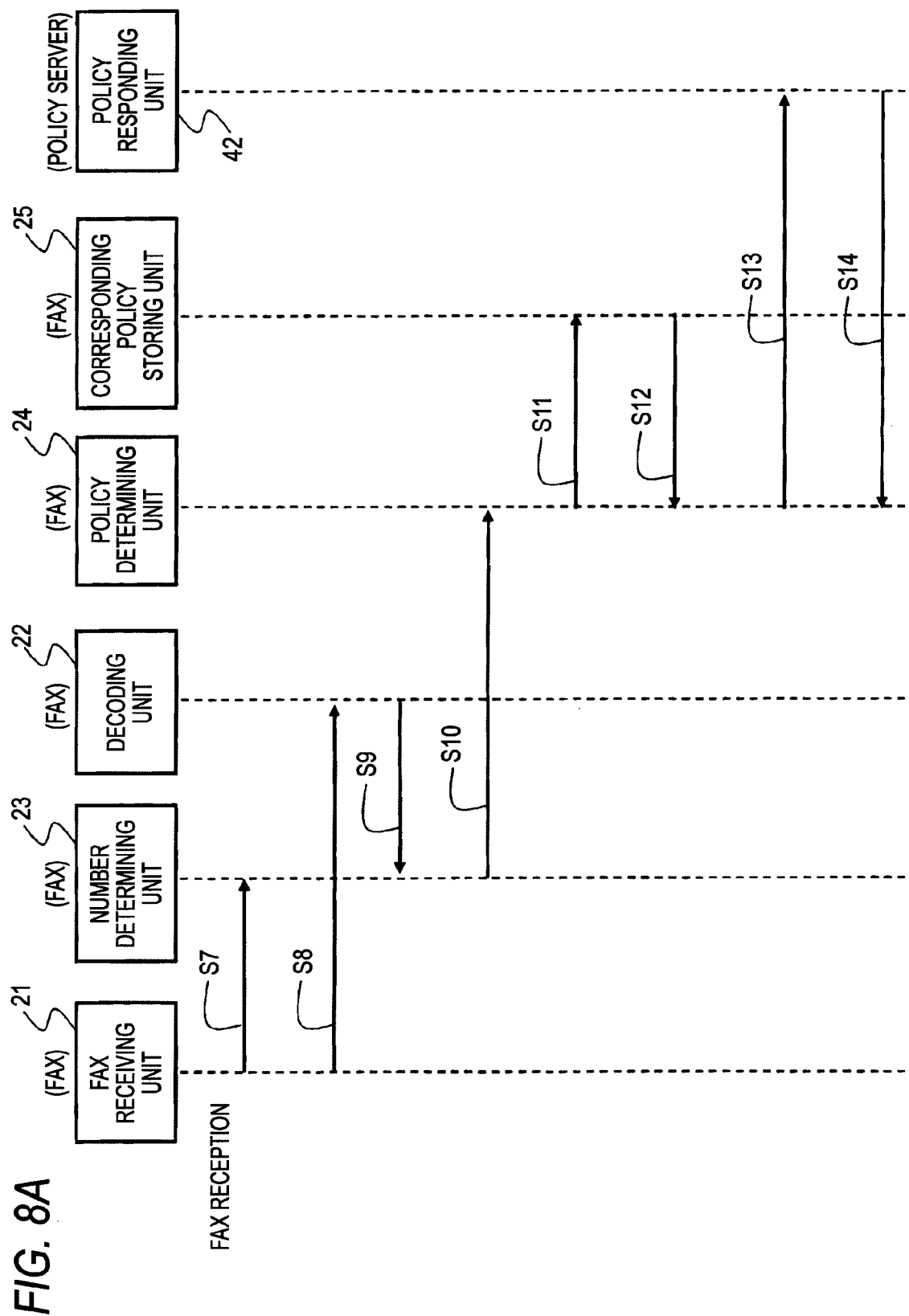
FIG. 8A is a diagram illustrating an example of sequence of automatically assigning use restriction information to a facsimile reception document.

First, referring to FIG. 8A, when the facsimile receiving unit 21 receives the signal received from the facsimile and the transmission source number based on the number notification function of the external facsimile apparatus 3 from the external facsimile apparatus 3, the facsimile receiving unit 21 transmits the transmission source number to the number determining unit 23 (S7) and transmits the signal received from the facsimile to the decoding unit 22 (S8). The decoding unit 22 decodes the signal received from the facsimile and reproduces document image data.

Meanwhile, when the transmission source number is not transmitted from the external facsimile apparatus 3, the facsimile receiving unit 21 does not transmit the transmission source number to the number determining unit 23 or transmits a signal representing that the transmission source number is not transmitted from the external facsimile apparatus 3, to the number determining unit 23. At this time, the number determining unit 23 reads the document image data of the facsimile reception document and acquires the transmission source number from the decoding unit 22 (S9). Since there are many cases where the transmission source number is printed at the top or bottom of a facsimile document, a condition of reading only text information at the top and bottom of the document image data when the number determining unit 23 reads the transmission source number may be set.

The number determining unit 23 transmits the transmission source number of the facsimile reception document to the policy determining unit 24 (S10). When a plurality of reception numbers are assigned to the facsimile apparatus 1, the reception number of the facsimile reception document is also transmitted to the policy determining unit 24. Meanwhile, when only one reception number is assigned to the facsimile apparatus 1, the number determining unit 23 may transmit only the transmission source number to the policy determining unit 24 with the reception number stored in advance in the policy determining unit 24, instead of transmitting the reception number to the policy determining unit 24 by the number determining unit 23.

When the transmission source number is not transmitted from the external facsimile apparatus 3 and the number determining unit 23 cannot read the transmission source number from the document data of the facsimile reception document, the number determining unit 23 transmits a signal representing that the transmission number cannot be read, to the policy determining unit 24.

The policy determining unit 24 transmits the received transmission source number and the reception number to the correspondence policy storing unit 25 (S11). The list of the combination of the transmission source number and the reception number and the policy ID corresponding to the pair shown in FIG. 3 are stored in the correspondence policy storing unit 25, and the correspondence policy storing unit 25 searches and extracts the policy ID corresponding to the transmission source number and the reception number received from the policy determining unit 24 on the basis of the list. When the transmission source number is not transmitted from the policy determining unit 24, the transmission source number is considered as "N/A" and the search of the policy ID is performed.

When the policy ID corresponding to the pair of the transmission source number and the reception number of the facsimile reception document is extracted, the correspondence policy storing unit 25 transmits the policy ID to the policy determining unit 24 (S12). Next, the policy determining unit 24 transmits the policy ID transmitted from the correspondence storing unit 25, to the policy responding unit 42 of the policy server 6 (S13). Hereinafter, Step S13 will be described. There is a case where the policy ID stored in the correspondence policy storing unit 25 of the facsimile apparatus 1 is deleted from the policy database 41 of the policy server 6. In this case, a proper document management may not be performed in the policy server 6. For this reason, the policy determining unit 24 confirms whether or not the policy ID transmitted from the correspondence policy storing unit 25 is stored (has not been deleted) also in the policy database 41 of the policy server 6.

The policy determining unit 24 transmits the policy ID to the policy responding unit 42, and the policy responding unit 42 confirms whether or not the policy ID transmitted from the policy determining unit 24 is stored in the policy database 41 with reference to the policy database 41. The policy responding unit 42 transmits the confirmation result to the policy determining unit 24 (S14). When the policy responding unit 42 refers to the policy list (FIG. 7) stored in the policy database 41 and the process requirement (printing of a secret mark, etc.) for the output medium in the policies corresponding to the policy IDs is set, the process requirement is also transmitted to the policy determining unit 24.

Returning to FIG. 8B, when the confirmation result transmitted from the policy responding unit 42 represents that the policy ID transmitted from policy determining unit 24 is stored (has not been deleted) in the policy database 41, the policy determining unit 24 determines the policy ID as a policy ID for the facsimile reception document and newly creates a document ID for identifying the facsimile reception document (S15). When the confirmation result transmitted from the policy responding unit 42 represents that the policy ID transmitted from the policy determining unit 24 is not stored (has been deleted) in the policy database 41, the policy determining unit 24 may transmit an instruction to perform a process (sounding an alarm, etc.) for making the user input the policy ID, to the facsimile apparatus 1. When the policy ID is input by the user, the policy determining unit 24 determines the policy ID as a policy ID for the facsimile reception document.

When the policy ID of the facsimile reception document is determined and the document ID is newly created, the policy determining unit 24 transmits the combination of the document ID and the policy ID to the policy registering unit 44 of the policy server 6 through the policy responding unit 42 (S16). The policy registering unit 44 registers the combination of the policy ID and the document ID in the document information database 43. Accordingly, the policy is assigned to the facsimile reception document.

When the registration of the document ID and the policy ID of the facsimile reception document is completed, the policy registering unit 44 transmits notification about the registration completion to the policy determining unit 24 through the policy responding unit 42 (S17). The policy determining unit 24 receiving the notification transmits process requirement thereof to the image processing unit 27 when the process requirement about an output medium is determined for the policy corresponding to the document ID and the policy ID (S18).

The document ID and the process requirement are transmitted from the policy determining unit 24 to the image processing unit 27, and the decoded document image data of the facsimile reception document is transmitted from the decoding unit 22 (S19). The image processing unit 27 adds the document ID and the process requirement to the document image data (S20). The document ID may be the notation shown in FIG. 4, and the document ID in a state of being converted into barcode or QR code which can be read by an electronic apparatus may be added to the document image data.

The document image data to which the document ID and the process requirement is added is transmitted from the image processing unit 27 to the image forming unit 28 (S21), and is output to the output medium (S22).

Figure 9A:
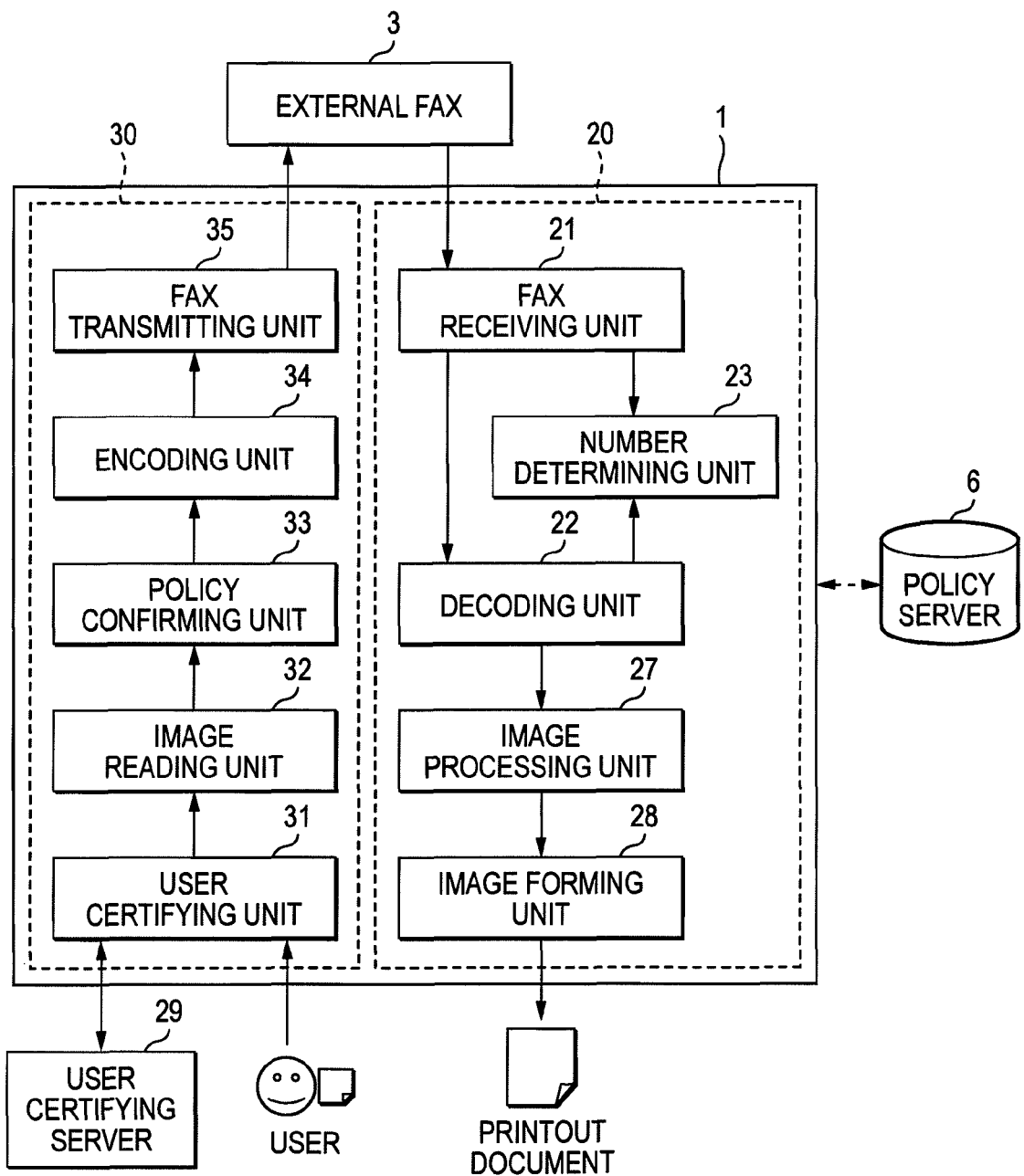
FIG. 9A is a functional block diagram illustrating an example of a facsimile apparatus and a policy server according to another exemplary embodiment.
Figure 9B:
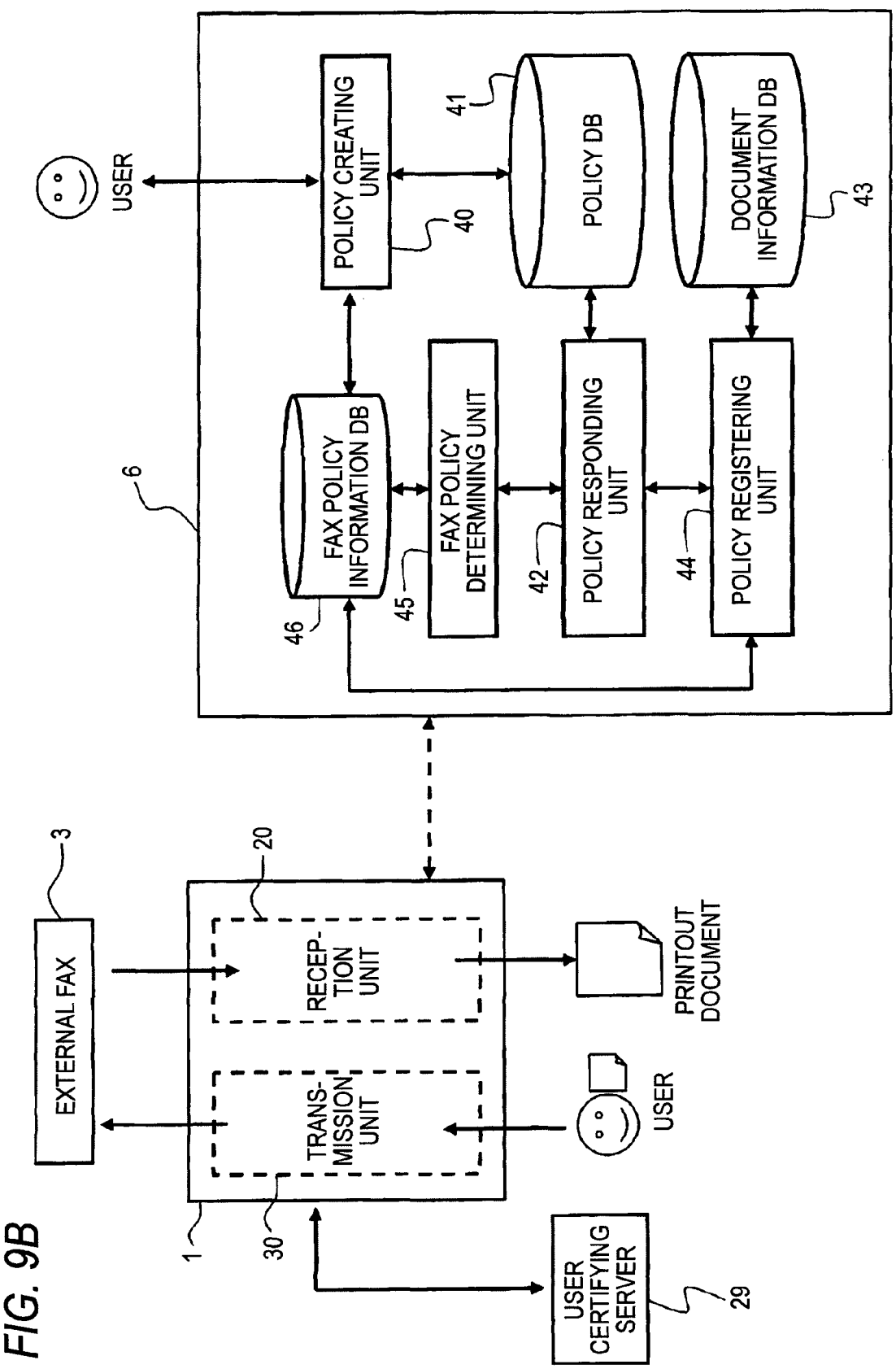
FIG. 9B is a functional block diagram illustrating an example of a facsimile apparatus and a policy server according to another exemplary embodiment.

The sequence up until the time when the facsimile apparatus 1 automatically assigns the policy to the facsimile reception document has been described above. Next, examples of a facsimile apparatus 1 and a policy server 6 according to another exemplary embodiment different from the above-described exemplary embodiment will be described with reference to FIG. 9A and FIG. 9B. FIG. 9A shows details of the facsimile apparatus 1, and FIG. 9B shows details of the policy server 6.

The facsimile apparatus 1 is provided with the reception unit 20 and the transmission unit 30 in the same manner as shown in FIG. 5A. The configurations of the units of the transmission unit 30 are the same as shown in FIG. 5A. The reception unit 20 is not provided with the policy determining unit 24, the correspondence policy storing unit 25, and the correspondence policy setting unit 26 shown in FIG. 5A, and is provided with a facsimile policy determining unit 45 which becomes a substitute for the policy determining unit 24 in the policy server 6 (FIG. 9B). The policy server 6 is provided therein with a facsimile policy information database 46 instead of the correspondence policy storing unit 25, and the correspondence policy setting unit 26 provided in the facsimile apparatus 1 shown in FIG. 5A is integrated into the policy creating unit 40 in the policy server 6 shown in FIG. 9B. The other configurations of the policy server 6 are the same as those in the policy server 6 shown in FIG. 5B. When the configurations are applied to the functional block diagram shown in FIG. 2, the first registration unit 11 is provided outside of the facsimile apparatus 1.

Figure 8B:
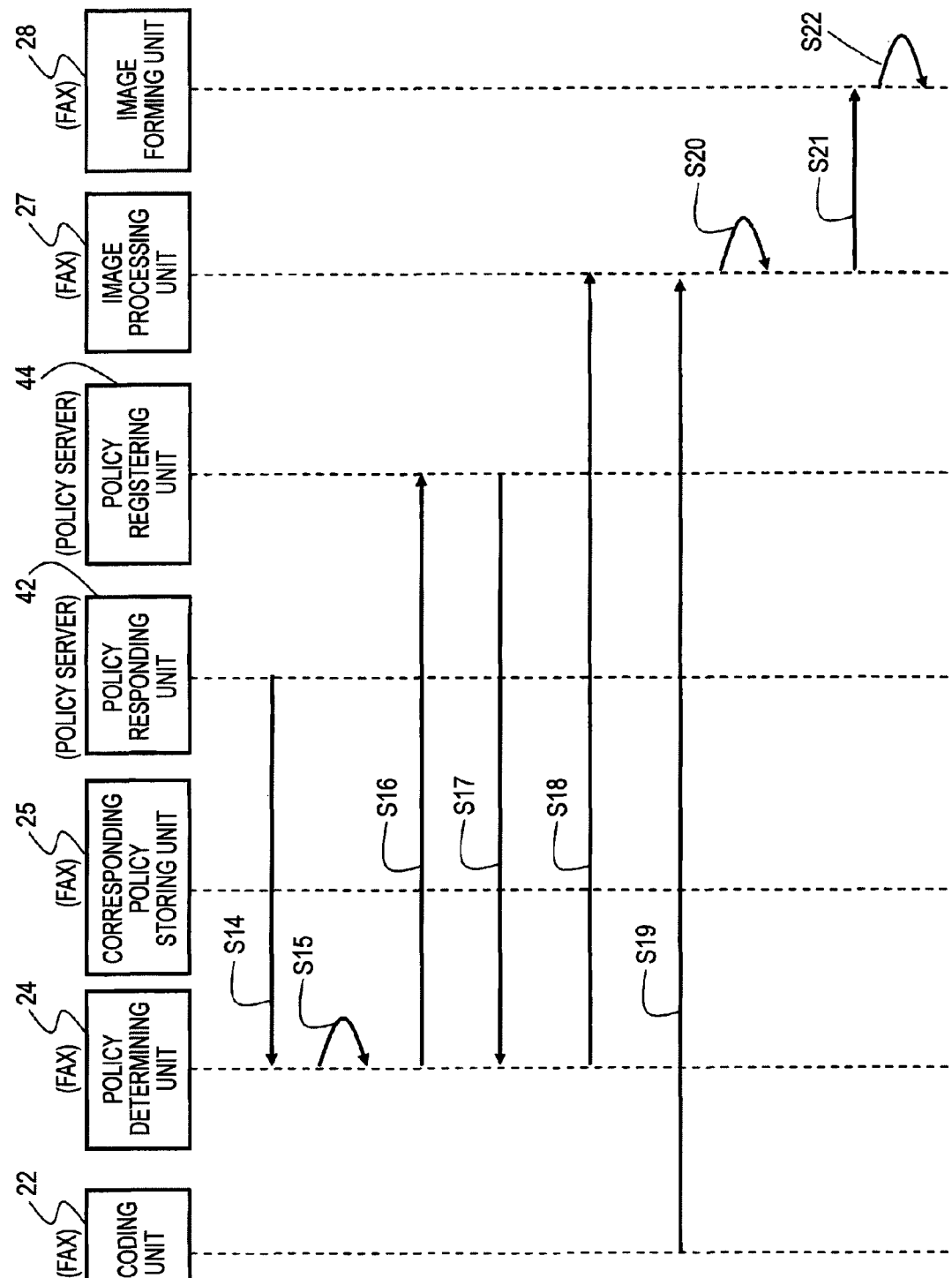
FIG. 8B is a diagram illustrating an example of sequence of automatically assigning use restriction information to a facsimile reception document.
Figure 10:
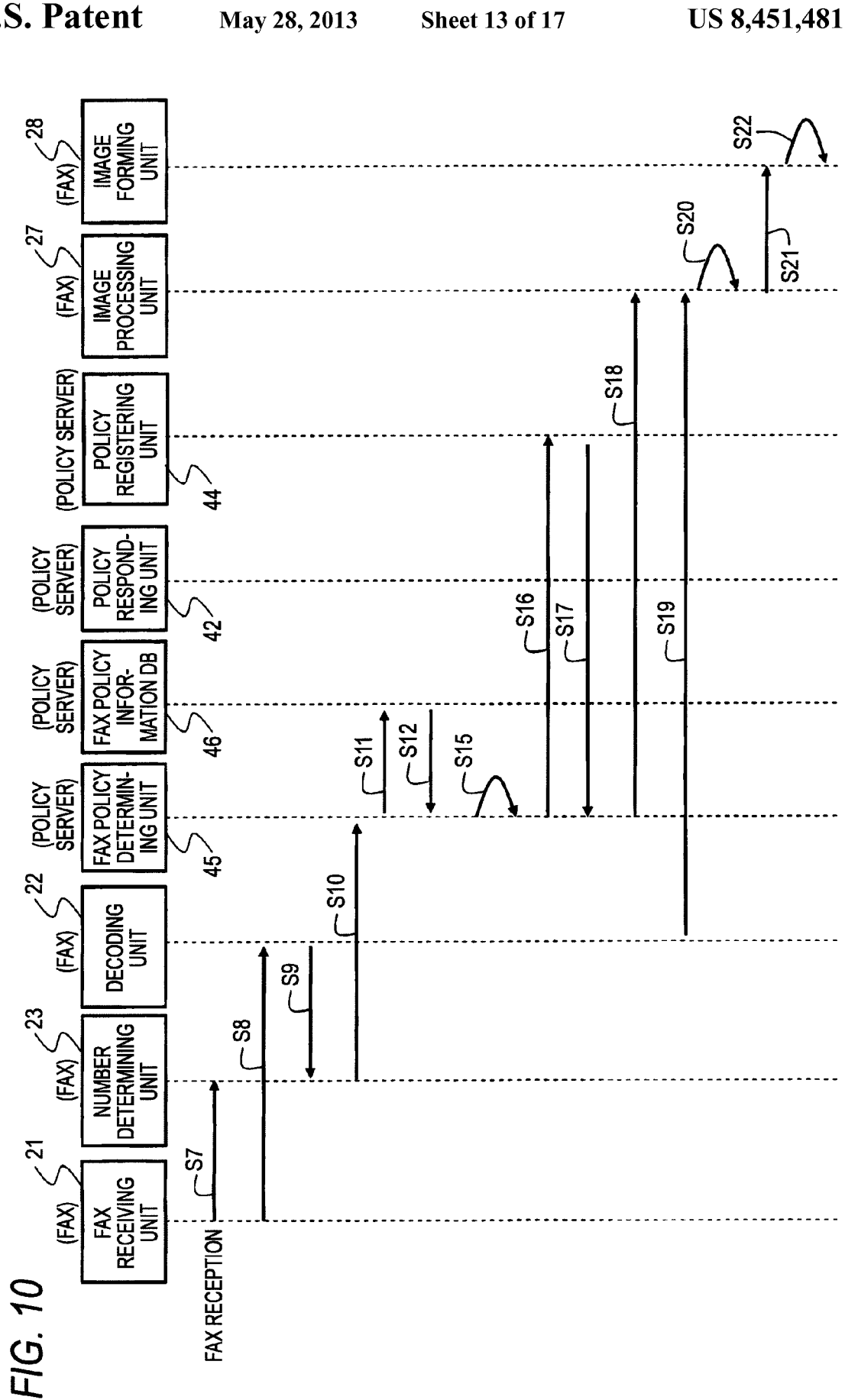
FIG. 10 is a diagram illustrating an example of sequence of automatically assigning use restriction information to a facsimile reception document.

In the facsimile apparatus 1 and the policy server 6 with such configurations, some of the sequence shown in FIG. 8A and FIG. 8B as described above are omitted in the automatic assignment of the policy of the facsimile reception document. This will be described with reference to FIG. 10. FIG. 10 shows the sequence in which the facsimile apparatus 1 and the policy server 6 shown in FIG. 9A and FIG. 9B automatically assign the policy of the facsimile reception document. In FIG. 10, the policy determining unit 24 is replaced by the facsimile policy determining unit 45, and the correspondence policy storing unit 25 is replaced by the facsimile policy information database 46, as compared with the FIG. 8A and FIG. 8B.

In FIG. 10, Step (S13) of confirming whether or not the policy ID corresponding to the transmission/reception numbers is stored in the policy database 41 and Step (S14) of returning the confirmation result was not described. This will now be described. Step S13 and the Step S14 are originally the steps of confirming whether or not the policy ID stored in the correspondence policy storing unit 25 provided in the facsimile apparatus 1 is also stored (has not been deleted) in the policy database provided in the policy server 6. However, the facsimile apparatus 1 shown in FIG. 9A and FIG. 9B is not provided the correspondence policy storing unit 25, and instead the policy server 6 is provided with the facsimile policy information database 46. That is, the policy server 6 is provided therein with the facsimile policy information database 46 and the policy database 41. Accordingly, when the policy ID is deleted from the policy database 41, the policy ID is thereby deleted also from the facsimile policy information database 46. Therefore, it is not necessary to perform the confirmation process such as Step S13 and Step S14.

In the exemplary embodiment, when the transmission source number and the reception number, and the policy ID for the pair are newly created, the new creating can be performed with a process of newly creating a policy. This will be described hereinafter.

Figure 11:
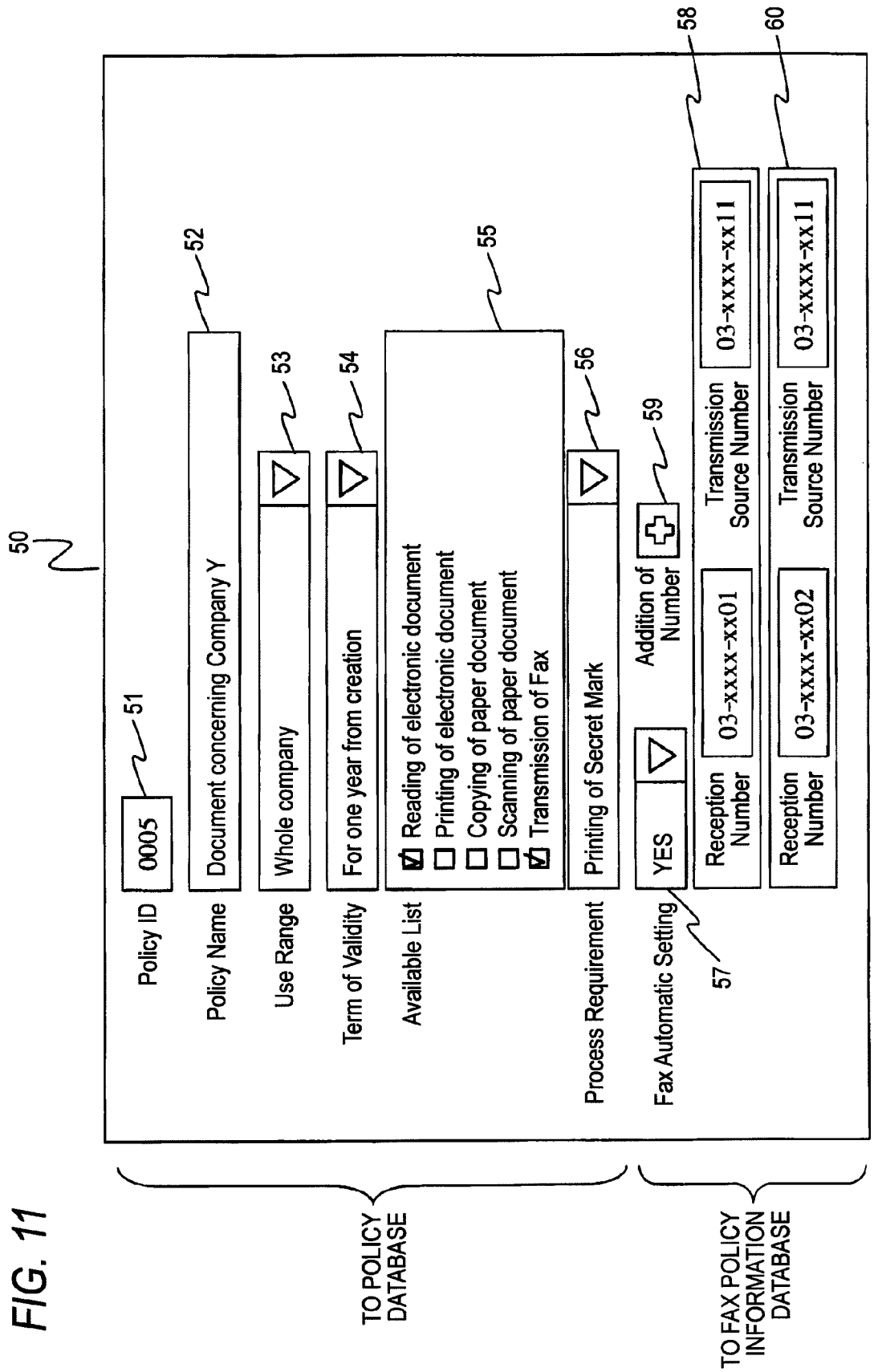
FIG. 11 is a diagram illustrating an example of a setting screen for newly setting use restriction information.

FIG. 11 shows an example of a new setting screen 50 of a policy displayed on a user interface of the policy creating unit 40. On the setting screen 50, a policy ID section 51, a policy name input section 52, a use range selection section 53, a validity term selection section 54, an available list 55, and a process requirement selection section 56 are displayed as sections for setting the policy. A facsimile automatic setting section 57, a transmission/reception number input section 58, a transmission/reception number input section adding button 59, and an added transmission/reception number input section 60 are displayed as sections for setting the policy ID corresponding to the transmission/reception numbers of the facsimile reception document.

A policy ID number which has not been registered yet in the policy database 41 is automatically input to the policy ID section 51 with reference to the policy database 41. A user who operates the policy creating unit 40 inputs a policy name to the policy name input section 52 by input unit such as a keyboard (not shown). As for the use range selection section 53, the validity term selection section 54, the available list 55, and the process requirement selection section 56, desired items may be selected from items stored in advance in the policy creating unit 40, or the user may directly input them.

When the user wants to set the present input policy to be automatically assigned to the facsimile reception document, the user may select "Yes" from the facsimile automatic setting section 57. The user inputs a transmission source number and a reception number to the transmission/reception number input section 58. When the user wants to assign the present input policy to combinations of a plurality of transmission source numbers and reception numbers, the user may select the transmission/reception number input section adding button 59. Accordingly, the transmission/reception number input section 60 is added. By this operation, the combination of the transmission source number and the reception number of the facsimile reception document and the combination of the policy ID corresponding thereto are registered.

When the input of the item sections shown in FIG. 11 is completed, the input contents of the policy ID section 51, the policy name input section 52, the use range selection section 53, the validity term selection section 54, the available list 55, and the process requirement selection section 56 are transmitted to the policy database 41, and the input contents of the policy ID section 51 and the transmission/reception number input sections 58 and 60 are transmitted to and stored in the facsimile policy information database 46.

The configurations of the facsimile apparatus 1 and the policy server 6 and the sequence of automatically assigning the policy to the facsimile reception document by the facsimile apparatus 1 have been described above. Next, an erroneous transmission preventing function in the transmission unit 30 of the facsimile apparatus 1 will be described.

Figure 12:
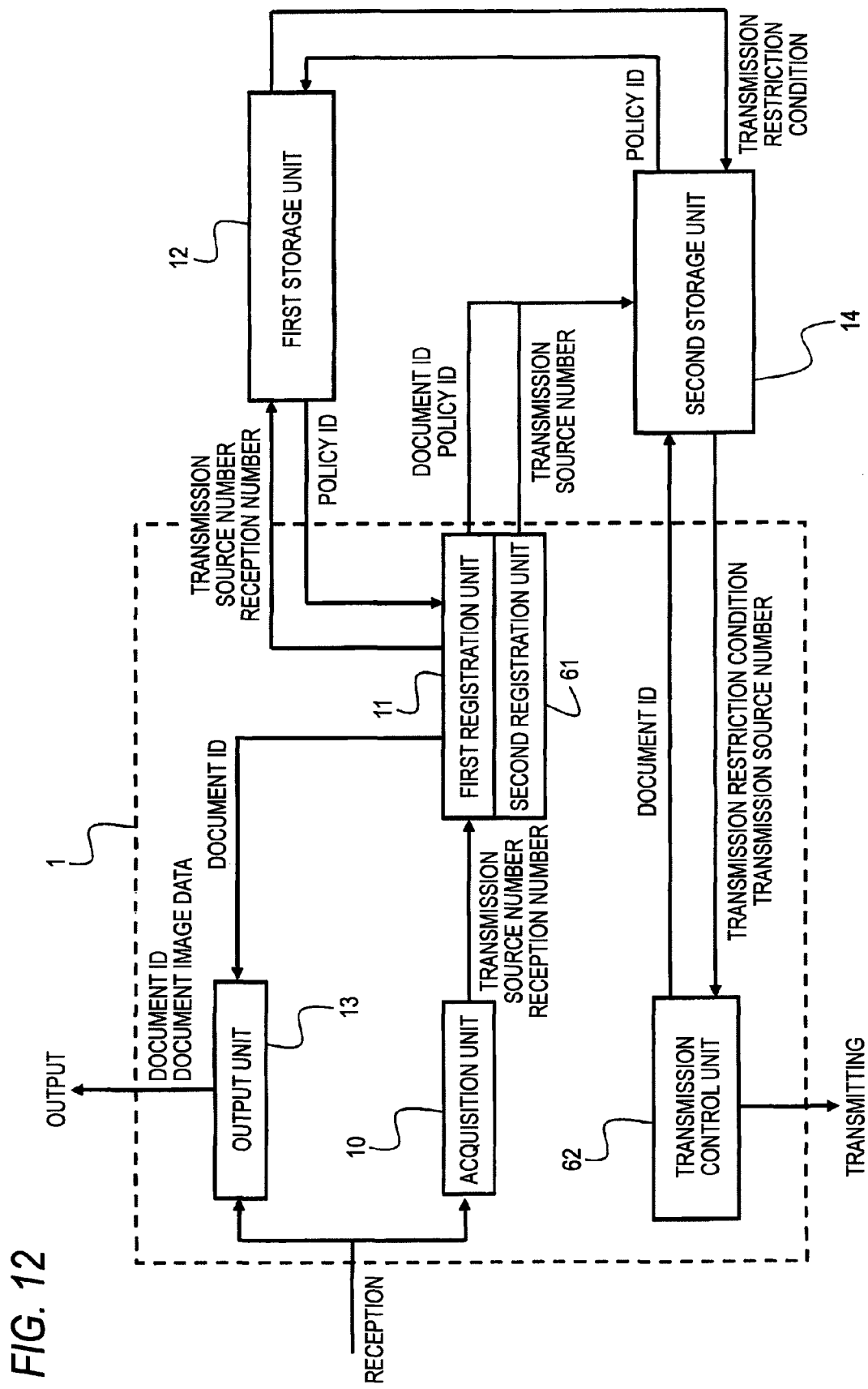
FIG. 12 is a functional block diagram illustrating an example of a facsimile apparatus according to another exemplary embodiment.

The facsimile apparatus 1 prevents erroneous transmission of the facsimile document by restricting the facsimile transmission to only reply to the transmission source when the facsimile document is transmitted to the external facsimile apparatus 3. FIG. 12 shows a functional block diagram of the facsimile apparatus 1 provided with units for performing the erroneous transmission preventing function. As shown in FIG. 12, the facsimile apparatus 1 is provided with second registration unit 61 and transmission control unit 62, in addition to the functional blocks shown in FIG. 2.

The second registration unit 61 will be described. The second registration unit 61 receives a transmission source number from the acquisition unit 10. When the first registration unit 11 stores the document ID and the policy ID of the facsimile reception document in the second storage unit 14, the transmission source number is also stored in the second storage unit 14. At this time, as shown in the list of FIG. 13, three types of the document IDs, the policy IDs, and the transmission source numbers of the facsimile reception documents are stored to be associated with each other in the second storage unit 14.

Subsequently, the transmission control unit 62 will be described. Returning to FIG. 12, the transmission control unit 62 is connected to the second storage unit 14. When the document ID is read in the course of reading the document as the facsimile transmission target, the transmission control unit 62 transmits the document ID to the second storage unit 14. The second storage unit 14 extracts the policy ID corresponding to the document ID of the transmission target document, and transmits the policy ID to the first storage unit 12.

The first storage unit 12 extract a policy corresponding to the transmitted policy ID. When a transmission restriction condition which restricts to reply to the transmission source is determined as a condition of facsimile transmission in the policy, the transmission restriction condition is transmitted to the second storage unit 14.

The second storage unit 14 receives the transmission restriction information, and searches a transmission source number corresponding to the document ID of the facsimile transmission document. When the transmission source number is extracted, the second storage unit 14 transmits the transmission source number, together with the transmission restriction condition transmitted from the first storage unit 12, to the transmission control unit 62.

The transmission control unit 62 compares the transmission source number transmitted from the second storage unit 14 with a transmission destination number of the facsimile transmission. When the transmission source number coincides with the transmission destination number, the facsimile transmission is performed. When the transmission source number does not coincide with the transmission destination number, the facsimile transmission is interrupted and an error message about the interruption is output from the output unit 13.

Hereinafter, the erroneous transmission preventing function will be described by exemplifying a case where the document ID of the facsimile transmission target document is "VED6483F-3304-11d2-86F1-006008B0E5D2" shown in FIG. 13. When the document ID of the facsimile transmission target document is read, the transmission control unit 62 transmits the document ID to the second storage unit 14. The second storage unit 14 extracts a policy ID "0004" corresponding to the document ID, and transmits it to the first storage unit 12. The first storage unit 12 acquires the transmission restriction condition "facsimile reply to transmission source" in the available function list corresponding to the policy ID "0004", with reference to the list shown in FIG. 7. The first storage unit 12 returns the transmission restriction information to the second storage unit 14.

Returning to FIG. 13, the second storage unit 14 extracts a facsimile transmission source number "03-XXXX-0001" corresponding to the document ID "VED6483F-3304-11d2-86F1-006008B0E5D2" on the basis of the transmission restriction information, and transmits the transmission restriction condition and the transmission source number to the transmission control unit 62. The transmission control unit 62 compares the facsimile transmission destination number with "03-XXXX-0001". When they coincide with each other, the facsimile transmission is performed. Only the transmission source number may be transmitted to the transmission control unit 62, and thus the transmission source number may be automatically compared with the facsimile transmission destination number when the transmission source number is transmitted.

The outline of the erroneous transmission preventing function has been described above. Next, the sequence of performing the erroneous transmission preventing function will be described by exemplifying the transmission unit 30 of the facsimile apparatus 1 and the policy server 6 shown in FIGS. 5A and 5B and FIGS. 9A and 9B. The number determining unit 23 shown in FIG. 5A and FIG. 9A corresponds to the acquisition unit 10 shown in FIG. 12, and the policy determining unit 24 shown in FIG. 5A and the facsimile policy determining unit 45 shown in FIG. 9B correspond to the first registration unit 11 and the second registration unit 61. The correspondence policy storing unit 25 shown in FIG. 5A and the facsimile policy information database 46 shown in FIG. 9B correspond to the first storage unit 12, and the image processing unit 27 and the image forming unit 28 correspond to the output unit 13. The policy responding unit 42 and the document information database 43 correspond to the second storage unit 14, and the policy confirming unit 33 corresponds to the transmission control unit 62.

FIG. 14 shows the sequence of performing the erroneous transmission preventing function. The user certifying unit 31 transmits a user ID of a user who performs an operation of facsimile transmission for the facsimile apparatus 1, to the user certifying server 29 (S23). When it is necessary to input a password to operate the facsimile apparatus 1, the password is also transmitted to the user certifying server 29. The user certifying server 29 confirms whether or not the user ID transmitted from the user certifying unit 31 is registered in the user certifying server 29, and returns the confirmation result to the user certifying unit 31 (S24). When the user ID that is a confirmation target is registered in the user certifying server 29, the user certifying server 29 transmits an instruction to read a facsimile transmission document to the image reading unit 32 (S25). Meanwhile, when the user ID that is the confirmation target is not registered in the user certifying server 29, the facsimile transmission is not performed.

The image reading unit 32 receives the instruction from the user certifying unit 31 and reads the facsimile transmission target document. When the document ID assigned to the facsimile transmission target document is read at the time of reading the document, the image reading unit 32 transmits the document ID to the policy confirming unit 33 (S26). The policy confirming unit 33 transmits the document ID of the facsimile transmission target document to the policy responding unit 42 (S27).

The policy responding unit 42 extracts a policy ID corresponding to the document ID transmitted from the policy confirming unit 33 with reference to the document information database 43 (see FIG. 13). The policy responding unit 42 searches a policy corresponding to the extracted policy ID with reference to the policy database 41 (see FIG. 7). When the available function list of the policy includes a transmission control condition such as "only reply to a transmission source of transmission functions is permitted", the policy responding unit 42 extracts the transmission control condition from the policy database 41. The policy responding unit 42 extracts a facsimile transmission source number corresponding to the policy ID again with reference to the document information database 43 (see FIG. 13). Lastly, the policy responding unit 42 transmits the transmission restriction condition and the transmission source number to the policy confirming unit 33 (S28). When the process requirement (see FIG. 7) is determined in addition to the transmission restriction condition and the transmission source number, the process requirement is transmitted to the policy confirming unit 33.

The policy confirming unit 33 confirms whether or not the transmission source number transmitted from the policy responding unit 42 coincides with the facsimile transmission number selected or input by the user, on the basis of the transmission restriction condition transmitted from the policy responding unit 42. When they coincide with each other, the policy responding unit 42 transmits an instruction to convert the document image data of the facsimile transmission target document read by the image reading unit 32 into a facsimile transmission signal, to the encoding unit 34 (S29). Meanwhile, when the transmission source number transmitted from the policy responding unit 42 does not coincide with the facsimile transmission number selected or input by the user, the policy confirming unit 33 does not perform the facsimile transmission.

The encoding unit 34 transmits the facsimile transmission signal to the facsimile transmitting unit 35 (S31). The facsimile transmitting unit 35 transmits the facsimile transmission signal to the external facsimile apparatus 3.

The erroneous transmission preventing function has been described above. The function of automatically assigning the policy ID to the facsimile reception document and the erroneous transmission preventing function may be performed by the computer 5 (see FIG. 1) connected to the facsimile apparatus 1 and the policy server 6. That is, a program for automatically setting the policy of the facsimile reception document to the facsimile apparatus 1 or the policy server 6 or executing the erroneous transmission preventing function may be stored in a storage unit (not shown) provided in the computer 5, and the program may be executed by an operation unit (not shown) provided in the computer 5. The program may be stored in a storage medium such as CD-ROM and read by the computer 5, and the program may be executed by the operation unit provided in the computer 5.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A facsimile apparatus comprising:
   an acquisition unit that acquires a transmission source number and a reception number of a facsimile reception document;
   a first registration unit that:
      acquires use restriction information corresponding to the transmission source number and the reception number acquired by the acquisition unit from a first storage unit for storing first correspondence relation information in which use restriction information of documents and transmission source numbers and reception numbers of facsimile communication are associated with each other, and
      registers second correspondence relation information in which the use restriction information and the facsimile reception document are associated with each other in a second storage unit for storing correspondence relation information between documents and use restriction information; and
   a reception unit that receives the facsimile reception document,
   wherein the transmission source number is either sent from a transmission source of the facsimile reception document, or included in the facsimile reception document,
   wherein the use restriction information is assigned to the facsimile reception document, and wherein the facsimile apparatus further comprises:
   an output unit that adds identification information of the facsimile reception document in the second storage unit to a document image of the facsimile reception document and outputs the document image with the identification information; and
   a preventing unit that prevents the output unit from outputting the document image until the use restriction information is assigned to the facsimile reception document.

2. The facsimile apparatus according to claim 1, wherein:
   the output unit outputs the document image with the identification information to a paper medium,
   and wherein the facsimile apparatus further comprises:
      a second registration unit that:
         associates the transmission source number of the facsimile reception document acquired by the acquisition unit with the identification information of the facsimile reception document, and
         registers the transmission source number and the identification information in the second storage unit; and
      a transmission control unit that:
         reads identification information of a transmission target document when receiving a facsimile transmitting instruction, and
         controls the facsimile transmission so that it is not to be performed when use restriction information associated with the read identification information and registered in the second storage unit indicates use restriction of allowing replying only to a transmission source and when the transmission source number associated with the read identification information and registered in the second storage unit does not coincide with a transmission destination number of the facsimile transmitting instruction.

3. The facsimile apparatus according to claim 2,
   wherein the output unit includes a printing unit and an identification information adding unit,
   wherein the printing unit prints document image data of the facsimile reception document on a recording medium, and
   wherein the identification information adding unit prints the identification information on the recording medium having the document image thereon.

4. The facsimile apparatus according to claim 1, wherein:
   the output unit outputs the document image with the identification information to a paper medium;
   and wherein the facsimile apparatus further comprises:
      a second registration unit that:
         associates the transmission source number of the facsimile reception document acquired by the acquisition unit with the identification information of the facsimile reception document, and
         registers the transmission source number and the identification information in the second storage unit; and
      a transmission control unit that:
         reads identification information of a transmission target document when receiving a facsimile transmitting instruction, and
         controls the facsimile transmission so that it is to be performed when use restriction information associated with the read identification information and registered in the second storage unit indicates use restriction of allowing replying only to a transmission source and when the transmission source number associated with the read identification information and registered in the second storage unit coincides with a transmission destination number of the facsimile transmitting instruction.

5. The facsimile apparatus according to claim 1, wherein, if the transmission source number is not sent from the transmission source, then the acquisition unit reads the facsimile reception document and acquires the transmission source number from the facsimile reception document.

6. An information processing method for a facsimile apparatus, comprising:
   acquiring a transmission source number and a reception number of a facsimile reception document;
   acquiring use restriction information corresponding to the acquired transmission source number and the acquired reception number from a first storage unit for storing first correspondence relation information in which use restriction information of documents and transmission source numbers and reception numbers of facsimile communication are associated with each other;
   registering second correspondence relation information in which the use restriction information and the facsimile reception document are associated with each other in a second storage unit for storing correspondence relation information between documents and use restriction information;

receiving, by a reception unit, the facsimile reception document; and either:

sending the transmission source number from a transmission source of the facsimile reception document; or including the transmission source number in the facsimile reception document, wherein the use restriction information is assigned to the facsimile reception document, and wherein the method further comprises:

adding identification information of the facsimile reception document to a document image of the facsimile reception document;

outputting the document image with the identification information; and preventing the outputting of the document image until the use restriction information is assigned to the facsimile reception document.

7. A non-transitory computer readable medium storing a program causing a computer to execute a process for setting use restriction information, the process comprising:

acquiring a transmission source number and a reception number of a facsimile reception document;

acquiring use restriction information corresponding to the acquired transmission source number and the acquired reception number from a first storage unit for storing first correspondence relation information in which use restriction information of documents and transmission source numbers and reception numbers of facsimile communication are associated with each other, registering second correspondence relation information in which the use restriction information and the facsimile reception document are associated with each other in a second storage unit for storing correspondence relation information between documents and use restriction information;

receiving, by a reception unit, the facsimile reception document; and either:

sending the transmission source number from a transmission source of the facsimile reception document; or including the transmission source number in the facsimile reception document, wherein the use restriction information is assigned to the facsimile reception document, and wherein the process further comprises:

adding identification information of the facsimile reception document to a document image of the facsimile reception document;

outputting the document image with the identification information; and preventing the outputting of the document image until the use restriction information is assigned to the facsimile reception document.

8. An information processing apparatus comprising:

a first storage unit that stores first correspondence relation information in which use restriction information of documents and transmission source numbers and reception number of facsimile communication are associated with each other;

a second storage unit that stores second correspondence relation information in which use restriction information and a facsimile reception document are associated with each other;

a registration unit that:

receives a transmission source number and a reception number of the facsimile reception document from a facsimile apparatus, acquires use restriction information corresponding to the transmission source number and the reception number with reference to the first storage unit, and registers correspondence relation information between the use restriction information and the facsimile reception document in the second storage unit;

a reception unit that receives the facsimile reception document, wherein the transmission source number is either sent from a transmission source of the facsimile reception document, or included in the facsimile reception document, wherein the use restriction information is assigned to the facsimile reception document, and wherein the information processing apparatus further comprises:

an output unit that adds identification information of the facsimile reception document in the second storage unit to a document image of the facsimile reception document and outputs the document image with the identification information; and a preventing unit that prevents the output unit from outputting the document image until the use restriction information is assigned to the facsimile reception document.

9. A non-transitory computer readable medium storing a program causing a computer to execute a process for setting use restriction information, the process comprising:

storing in a first storage unit, first correspondence relation information in which use restriction information of documents and transmission source numbers and reception number of facsimile communication are associated with each other;

storing in a second storage unit, second correspondence relation information in which use restriction information and a facsimile reception document are associated with each other;

receiving a transmission source number and a reception number of the facsimile reception document from a facsimile apparatus;

acquiring use restriction information corresponding to the transmission source number and the reception number with reference to the first storage unit;

registering correspondence relation information between the use restriction information and the facsimile reception document in the second storage unit;

receiving, by a reception unit, the facsimile reception document; and either:

sending the transmission source number from a transmission source of the facsimile reception document; or including the transmission source number in the facsimile reception document, wherein the use restriction information is assigned to the facsimile reception document, and wherein the process further comprises:

adding identification information of the facsimile reception document to a document image of the facsimile reception document;

outputting the document image with the identification information; and preventing the outputting of the document image until the use restriction information is assigned to the facsimile reception document.

\* \* \* \* \*